US010238237B2

(12) United States Patent
Chen et al.

(10) Patent No.: US 10,238,237 B2
(45) Date of Patent: *Mar. 26, 2019

(54) TOASTER

(71) Applicant: TSANN KUEN (ZHANG ZHOU) ENTERPRISE CO., LTD., Zhangzhou, Fujian Province (CN)

(72) Inventors: Zhenwei Chen, Zhang Zhou (CN); Wangji Tong, Zhang Zhou (CN); Shangqian Gao, Zhang Zhou (CN); Yen Tung Lee, Kaohsiung (TW); Yu-Chuan Lin, New Taipei (TW)

(73) Assignee: Tsann Kuen (Zhanzhou) Enterprise Co., Ltd., Zhang Zhou, Fujian (CN)

( * ) Notice: Subject to any disclaimer, the term of this patent is extended or adjusted under 35 U.S.C. 154(b) by 262 days.

This patent is subject to a terminal disclaimer.

(21) Appl. No.: 13/780,904

(22) Filed: Feb. 28, 2013

(65) Prior Publication Data

US 2013/0220144 A1     Aug. 29, 2013

(30) Foreign Application Priority Data

Feb. 29, 2012 (CN) .......................... 2012 2 0072091

(51) Int. Cl.
*A47J 37/08* (2006.01)

(52) U.S. Cl.
CPC ................. *A47J 37/0871* (2013.01)

(58) Field of Classification Search
CPC .... A47J 37/0814; A47J 37/08; A47J 37/0688; A47J 37/0871; F24C 7/04; F24C 15/04
USPC ............... 99/385–389, 391, 392, 393, 341
See application file for complete search history.

(56) References Cited

U.S. PATENT DOCUMENTS

| 3,146,692 A * | 9/1964 | Connolly et al. ............... 99/379 |
| 3,169,469 A * | 2/1965 | Parr .................................. 99/400 |
| 3,438,318 A * | 4/1969 | Williams ..................... 99/329 R |
| 3,533,350 A * | 10/1970 | Dokos et al. ............... 99/329 R |
| 3,587,907 A * | 6/1971 | Okuda et al. ............... 220/4.01 |
| 3,693,538 A * | 9/1972 | Synder ................ A47J 37/0635 219/405 |

(Continued)

FOREIGN PATENT DOCUMENTS

| CN | 201279071 | * 7/2009 |
| CN | 202604610 | * 12/2012 |

(Continued)

*Primary Examiner* — Ibrahime A Abraham
*Assistant Examiner* — Frederick Calvetti
(74) *Attorney, Agent, or Firm* — Edward E. Sowers; Brannon Sowers & Cracraft PC

(57) ABSTRACT

A toaster has a housing has an operation cavity and a heating cavity. One side of the housing has a first opening, at least one second opening is disposed at the bottom of the housing, the operation cavity is connected to the heating cavity; a longitudinal groove with same number with the second opening, the longitudinal groove is disposed inside the housing, the longitudinal groove is extended upwards from the second opening; at least one transparent movable baffle, which is sliding and connected to the longitudinal groove from the bottom of the housing from down to up, part of the side surface of the movable baffle is exposed to the first opening; and at least one positioning mechanism, which is fastened to the housing and positioned or supported the movable baffle.

9 Claims, 7 Drawing Sheets

(56) References Cited

U.S. PATENT DOCUMENTS

| | | | | |
|---|---|---|---|---|
| 4,188,867 | A * | 2/1980 | DeRemer | A47J 37/0623 99/385 |
| 4,290,349 | A * | 9/1981 | Fiorenza | 99/388 |
| 5,156,637 | A * | 10/1992 | Wai-Ching | A47J 37/0892 99/388 |
| 6,112,648 | A * | 9/2000 | Origane | A47J 37/0892 99/385 |
| 6,125,234 | A * | 9/2000 | de Jenlis | A47J 37/0807 219/385 |
| 6,305,273 | B1 * | 10/2001 | Sherman | 99/393 |
| 6,357,343 | B1 * | 3/2002 | Tomsich | A47J 37/0857 99/329 RT |
| 6,429,407 | B1 * | 8/2002 | Garber | A47J 37/0814 219/386 |
| 6,717,110 | B2 * | 4/2004 | Van der Meer | A47J 37/0807 219/386 |
| D704,496 | S * | 5/2014 | Coppersmith | D7/330 |
| 2001/0016222 | A1 * | 8/2001 | Tomsich | A47J 37/08 426/523 |
| 2001/0042447 | A1 * | 11/2001 | Thiriat | 99/327 |
| 2002/0073854 | A1 * | 6/2002 | Chasen | A47J 37/0623 99/385 |
| 2002/0113054 | A1 * | 8/2002 | Arel | A47J 37/0871 219/388 |
| 2006/0049166 | A1 * | 3/2006 | Picozza | A47J 37/0871 219/386 |
| 2006/0180033 | A1 * | 8/2006 | Pan | A47J 37/0892 99/388 |
| 2008/0173185 | A1 * | 7/2008 | Lam | 99/339 |
| 2009/0071347 | A1 * | 3/2009 | Lee | 99/341 |
| 2009/0288563 | A1 * | 11/2009 | Lim | 99/326 |
| 2010/0275789 | A1 * | 11/2010 | Lee et al. | 99/386 |
| 2011/0239871 | A1 * | 10/2011 | Lin | A47J 37/0857 99/385 |
| 2011/0303099 | A1 * | 12/2011 | Lazzer | 99/385 |
| 2012/0031389 | A1 * | 2/2012 | McMaster | F24C 15/045 126/200 |

FOREIGN PATENT DOCUMENTS

| | | | |
|---|---|---|---|
| GB | 2470471 | * | 11/2010 |
| JP | 08000466 | * | 1/1996 |
| JP | 08140862 | * | 6/1996 |
| JP | 2007307117 | * | 11/2007 |
| KR | 2009013113 U | * | 12/2009 |
| WO | WO2007140652 | * | 12/2007 |

* cited by examiner

TOASTER

FIELD OF THE INVENTION

The present invention relates to a toaster.

BACKGROUND OF THE INVENTION

The traditional toaster adopts with non-transparent material, so people can't watch the interior operation status. Besides the baffle of the heating cavity is unmovable, so that the dirt or the oil on the baffle can't be cleaned. Other toaster adopts a movable baffle, but the baffle is drawn out from top, left or the right, which disrupts the line and the shape of the toaster and either the appearance.

SUMMARY OF THE INVENTION

The present invention is provided with a toaster, which overcomes the disadvantages of the existing toaster. The technical proposal of the present invention to overcomes the technical problems is below:

A toaster includes:

A housing, which is disposed with an operation cavity and a heating cavity, one side of the housing is disposed with a first opening, at least one second opening is disposed at the bottom of the housing, the operation cavity is connected to the heating cavity;

A longitudinal groove with same number with the second opening, the longitudinal groove is disposed inside the housing, the longitudinal groove is extended upwards from the second opening;

At least one transparent movable baffle, which is sliding and connected to the longitudinal groove from the bottom of the housing from down to up, part of the side surface of the movable baffle is exposed to the first opening; and At least one positioning mechanism, which is fastened to the housing and positioned or supported the movable baffle.

In another preferred embodiment, the housing includes a base, the positioning mechanism includes a handle seat and a lock component rotated and connected to the handle seat, the lock component is locked to the seat or separated from the seat by rotating the lock component; the moving baffle is fixed to the handle seat.

In another preferred embodiment, an elastic component is disposed between the lock component and the handle seat.

In another preferred embodiment, the lock component is Z shaped.

In another preferred embodiment, a groove is disposed at the bottom of the housing, the positioning mechanism is coupled to the groove, the bottom surface of the positioning mechanism is parallel to the bottom surface of the housing.

In another preferred embodiment, the transparent movable baffle is made of glass.

In another preferred embodiment, a thermal insulation glass is disposed between the movable baffle and the side surface of the housing.

In another preferred embodiment, the number of the movable baffle is one.

Compared to the existing technology, the technical proposal of the present invention has advantages as below:

1. Part of the side surface of the transparent movable baffle is exposed to the first opening, it can be observed from the exterior with the heating status of the toast through the first opening and the transparent movable baffle. The movable baffle is sliding and connected to the longitudinal groove from the bottom of the housing from down to up and positioned by the positioning mechanism, making it able to be drawn out of the housing to clean, so that the present invention preserves health, cleanliness and taste. Besides, the movable baffle is drawn out from the bottom, not affecting the appearance of the entire machine.

2. The positioning mechanism includes a handle base and a lock component rotated and connected to the handle base, the lock component is locked to the base or separated from the base by rotating the lock component. The positioning mechanism is simple structured with low cost, and the positioning is firm.

3. A groove is disposed on the bottom surface of the housing, and the positioning mechanism is coupled to the groove, the bottom surface of the positioning mechanism is parallel to the bottom surface of the housing, making the entire positioning mechanism hiding at the bottom of the toaster to make sure the appearance of the toaster.

4. A thermal insulation glass is disposed between the movable baffle and the side surface of the housing, preventing scalding and security risks.

BRIEF DESCRIPTION OF THE DRAWINGS

The present invention will be further described with the drawings and the embodiments.

DETAILED DESCRIPTION OF THE EMBODIMENT

Figure 1:
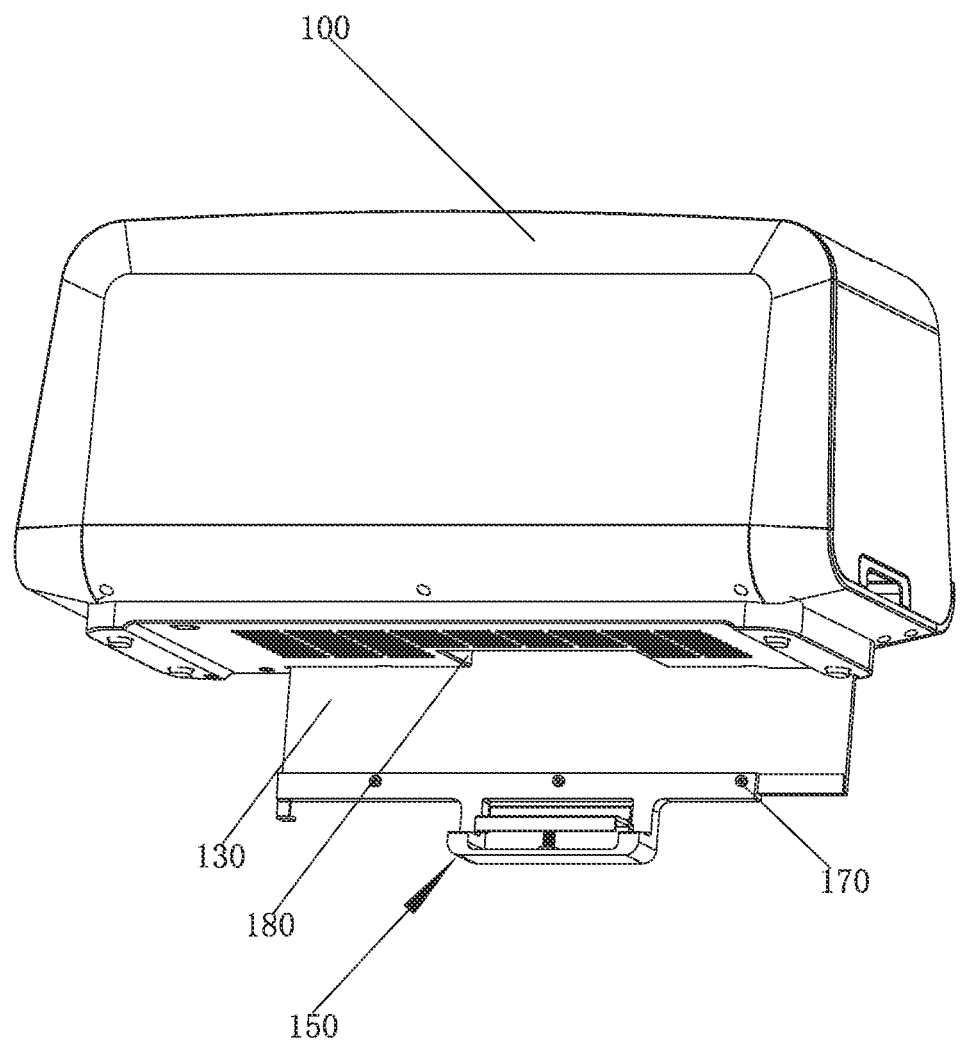
FIG. 1 illustrates the toaster of the first embodiment when the movable baffle is being drawn out.
Figure 2:
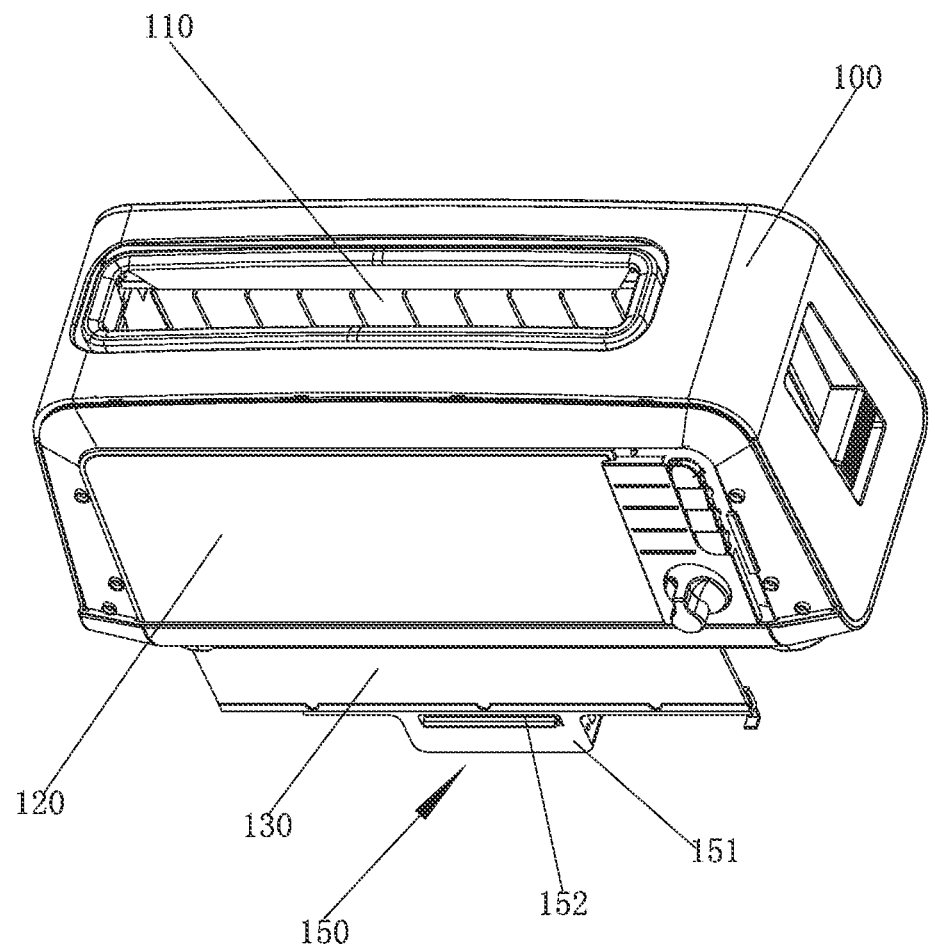
FIG. 2 illustrates another status of the toaster of the first embodiment when the movable baffle is being drawn out.
Figure 3:
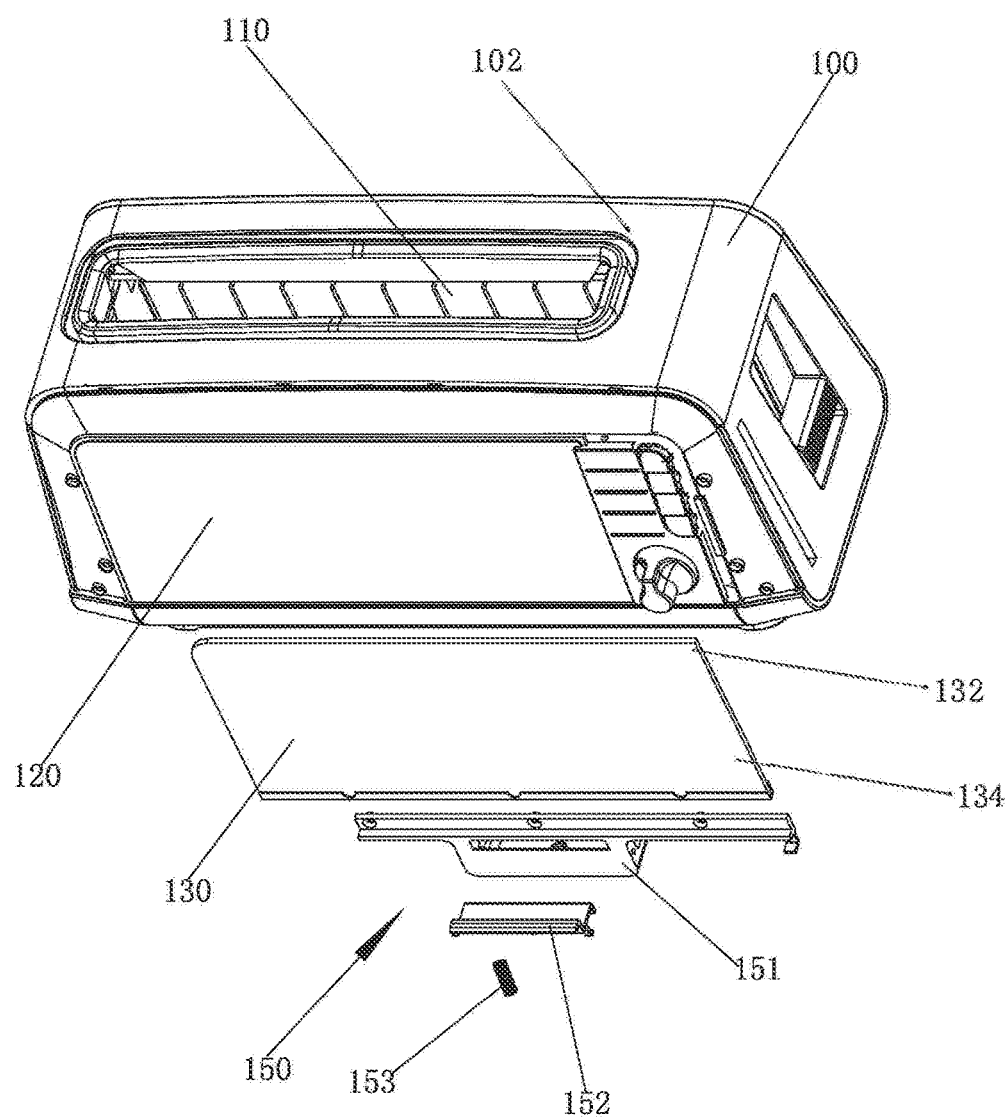
FIG. 3 illustrates the front view of the positioning mechanism of the toaster of the first embodiment.
Figure 4:
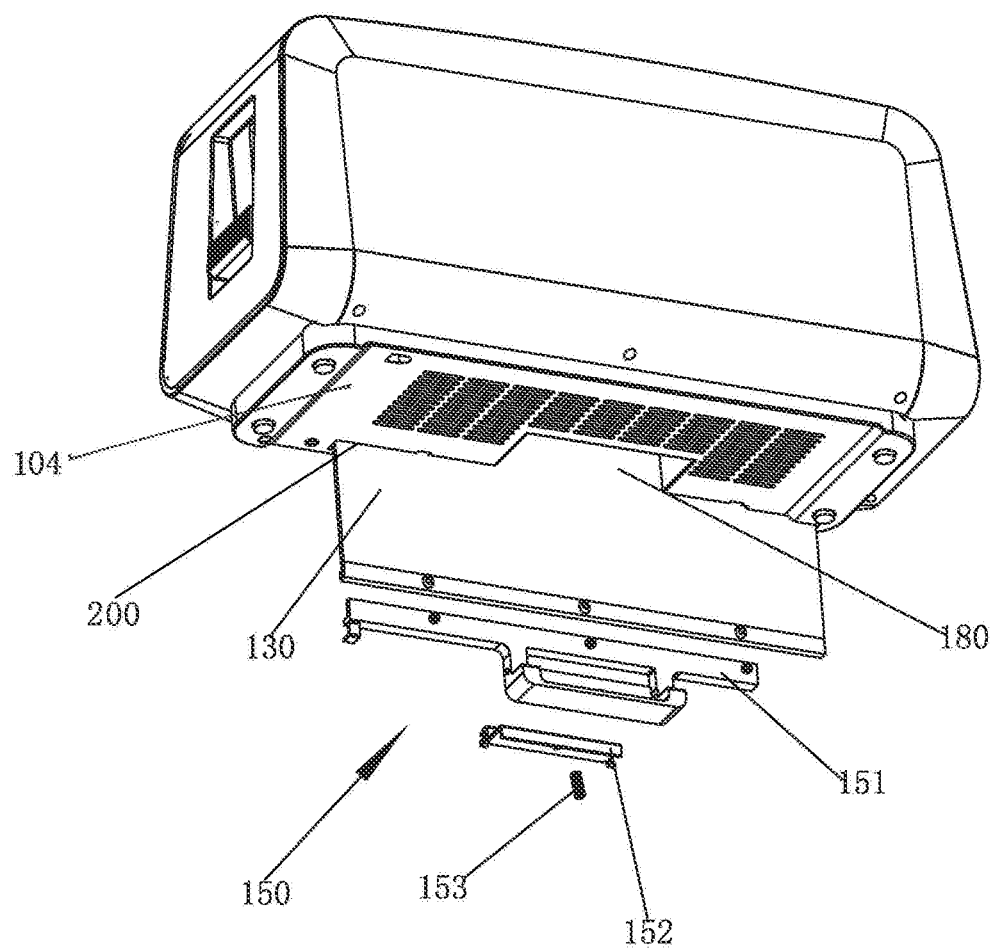
FIG. 4 illustrates the back view of the positioning mechanism of the toaster of the first embodiment.

Refer to the FIG. 1 to FIG. 7. A toaster of the first embodiment includes a housing 100, a heating cavity 110, an operation cavity, a movable baffle 130 and a positioning mechanism 150.

The housing 100 is disposed with the operation cavity and the heating cavity 110 inside. The heating cavity 110 opens at the top 102 of the housing 100. One side of the housing 100 is disposed with a first opening 120. The housing 100 is disposed with at least one second opening 200 at the bottom 104. The operation cavity is connected to the heating cavity 110. The housing 100 is disposed with a longitudinal groove with same number with the second opening 200. The longitudinal groove is extended upwards from the second opening 200. Preferred, the first opening is disposed with a piece of glass.

The movable baffle 130 has a first end 132 and a second end 134. The movable baffle 130 is transparent and it is sliding and connected to the longitudinal groove from the bottom of the housing 100 from down to up. Part of the side surface of the movable baffle 130 is exposed to the first opening 120, so people can watch the food through the first opening 120 and the transparent movable baffle 130 from the exterior of the toaster to know the heating state of the food conveniently. In this embodiment, there is one movable baffle 130. The number of movable baffles 130 can be adjusted as required. The movable baffle 130 can be moved out from the housing 100 to clean, so that the present invention preserves health, cleanliness and taste. Besides, the movable baffle 130 is drawn out from the bottom, not affecting the appearance of the entire machine.

The positioning mechanism 150 is fastened to the housing 100 to be positioned and supported the movable baffle 130. In this embodiment, the housing 100 is further disposed with a base 160 inside. The positioning mechanism 150 is locked to the base 160. The positioning mechanism 150 includes a handle base 151 and a lock component 152 rotated and connected to the handle base 151, the rotation shaft 154 is disposed in the lock component 152, the lock component 152 is locked to the base 160 or separated from the base 150 by rotating the lock component 152. The movable baffle 130 is fixed to the handle base 151. In this embodiment, the movable baffle 130 is connected to the handle base 151 by a bolt 170 and the handle base 151 is disposed below the movable baffle 130. The lock component 152 is Z shaped. Preferred, an elastic component 153 is disposed between the lock component 152 and the handle base 151 to enhance the hand feel.

Figure 5:
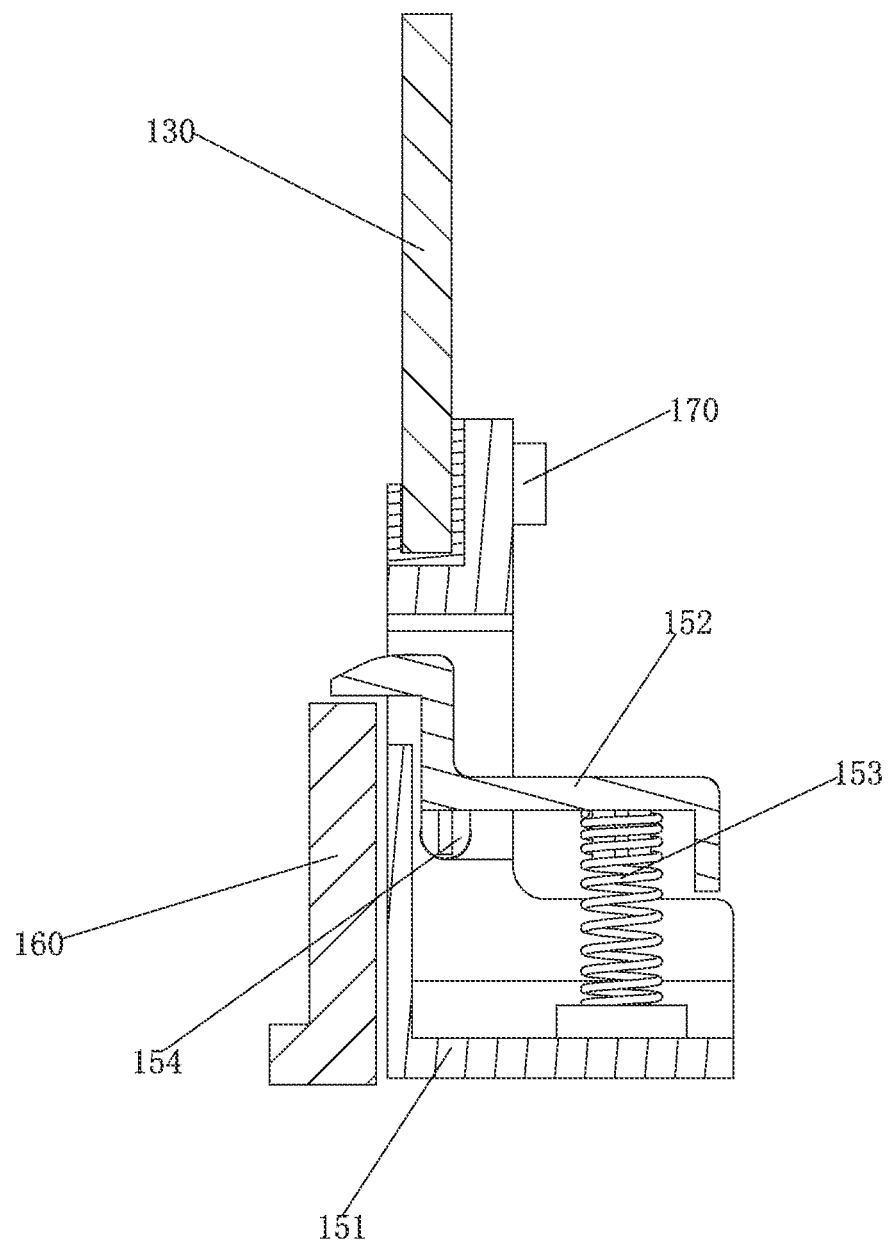
FIG. 5 illustrates the first sectional view of the positioning mechanism of the toaster of the first embodiment.
Figure 6:
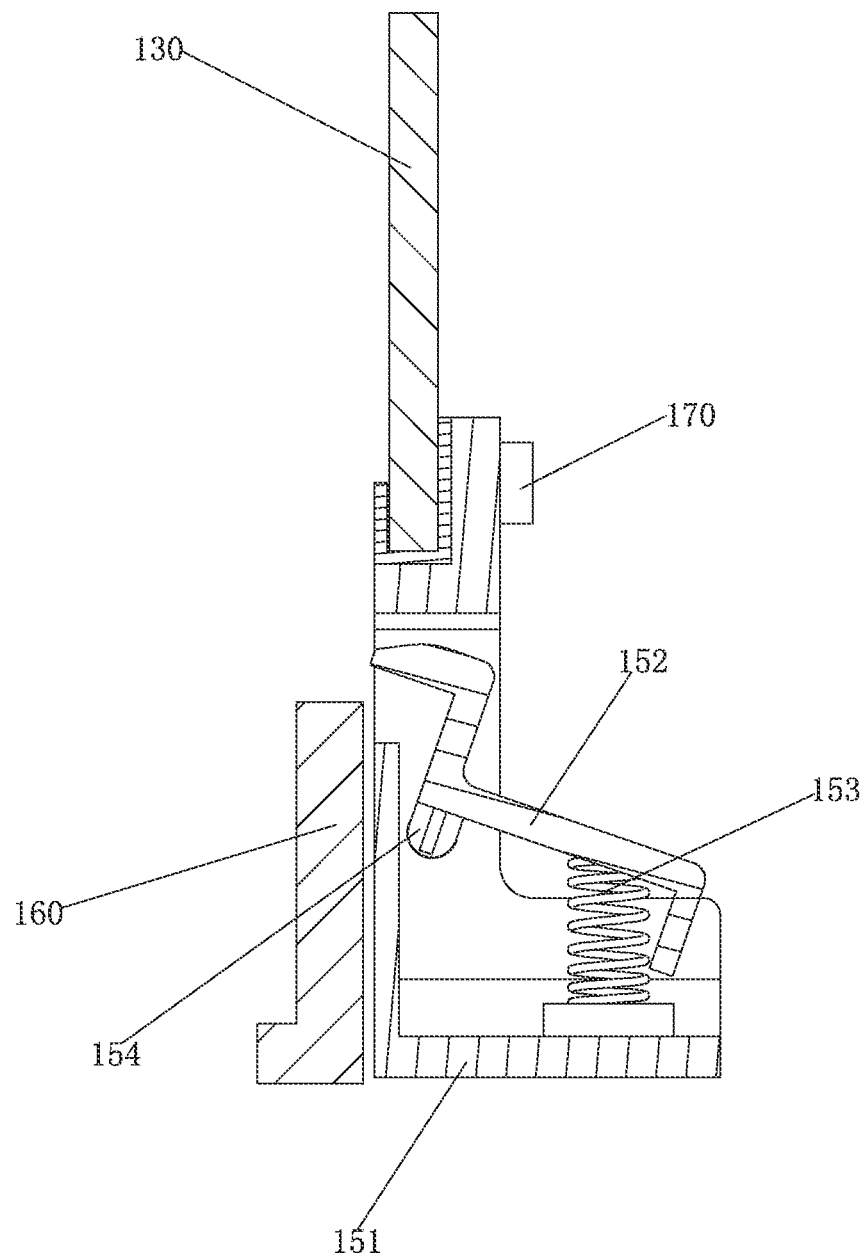
FIG. 6 illustrates the second sectional view of the positioning mechanism of the toaster of the first embodiment.
Figure 7:
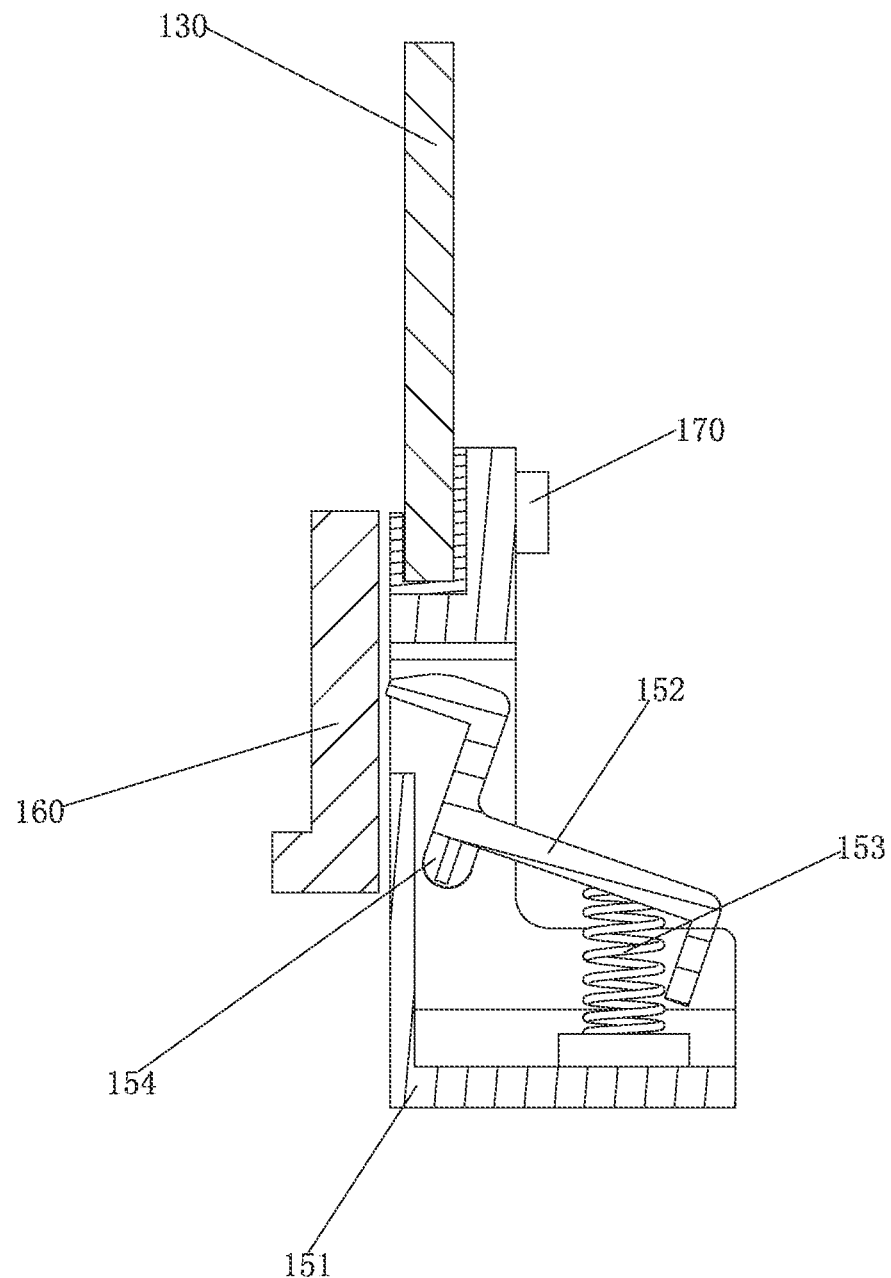
FIG. 7 illustrates the third sectional view of the positioning mechanism of the toaster of the first embodiment.

Refer to the FIG. 5 to the FIG. 7. To remove the movable baffle 130 to wash, press the lock component 152 to make the elastic component 153 elastic deforming, at the same time, the lock component 152 is driven to rotate about the rotation shaft 154 to make the lock component 152 separated from the base 160, then what is needed to do is to draw out the movable baffle 130 from the bottom of the housing 100. The positioning mechanism is simple structured with low cost, and the positioning is firm. A groove 180 is disposed on the bottom surface of the housing 100, and the positioning mechanism 150 is coupled to the groove 180. The bottom surface of the positioning mechanism 150 is parallel to the bottom surface of the housing 100, making the entire positioning mechanism 150 hiding at the bottom of the toaster to ensure it look well.

In this embodiment, the movable baffle 130 is made of glass. It can be observed from the exterior with the heating status of the toast, making it convenient to use. Preferred, a fireproof glass is disposed between the movable baffle 130 and the side surface of the housing 100 to prevent scalding and security risks.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

What is claimed is:

1. A toaster comprising:
a housing having a heating cavity, a longitudinal side and a bottom, the bottom having a bottom surface;
a first opening on the longitudinal side of the housing, the first opening defining a first length and being configured to show the heating cavity;
a second opening on the bottom surface, the longitudinal side of the housing extending to the bottom of the housing, and defining a longitudinal edge of the second opening;
a transparent movable baffle having a first end and a second end, wherein in operation the transparent movable baffle transits between a closed state when the first end of the transparent movable baffle passes through the second opening to close the housing and an open state when the transparent movable baffle is removed through the second opening; and
a positioning mechanism fixed to and supporting the transparent movable baffle at the second end, the positioning mechanism reversibly locked to the housing in the closed state, the positioning mechanism comprising:
a handle base;
a lock component connected to the handle base; and
a rotating shaft disposed in the lock component; the lock component pivoting about the rotating shaft between a locked position in the closed state and a separated position, the lock component locked to the housing in the closed state.

2. The toaster according to claim 1, further comprising a longitudinal groove extending upwards from the second opening.

3. The toaster according to claim 1, wherein the positioning mechanism further comprises an elastic component disposed between the lock component and the handle base, the elastic component urging the lock component to the locked position.

4. The toaster according to claim 1, wherein the housing further comprises a base on the longitudinal side, the lock component engaging the base in the locked position.

5. The toaster according to claim 1, wherein the moving baffle is fixed to the positioning mechanism by a bolt.

6. The toaster according to claim 1, wherein the lock component is Z-shaped.

7. The toaster according to claim 1, wherein the bottom of the housing has a cutout for receiving the positioning mechanism; the positioning mechanism has a second bottom; and
the second bottom is flush with the bottom of the housing when the positioning mechanism is in the locked position.

8. The toaster according to claim 1, wherein the transparent movable baffle is a glass.

9. The toaster according to claim 1, further comprising a thermal insulation glass on the longitudinal side of the housing.

* * * * *